(12) United States Patent
Hoffman et al.

(10) Patent No.: US 10,566,699 B2
(45) Date of Patent: *Feb. 18, 2020

(54) SYSTEM AND METHOD FOR RADIO FREQUENCY PENETRATION IMAGING OF AN OBJECT

(71) Applicant: Vayyar Imaging Ltd., Yehud (IL)

(72) Inventors: Damian Hoffman, Tzur Yitzhak (IL); Jonathan Rosenfeld, Ramat hasharon (IL)

(73) Assignee: VAYYAR IMAGING LTD., Yehud (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,319

(22) Filed: May 3, 2019

(65) Prior Publication Data
US 2019/0260134 A1 Aug. 22, 2019

Related U.S. Application Data (63) Continuation of application No. 15/226,048, filed on Aug. 2, 2016, now Pat. No. 10,290,948.
(Continued)

(51) Int. Cl.
*H01Q 17/00* (2006.01)
*H01Q 21/00* (2006.01)
(Continued)

(52) U.S. Cl.
CPC .......... *H01Q 17/00* (2013.01); *G01S 13/888* (2013.01); *G01S 13/89* (2013.01); *H01Q 1/225* (2013.01);
(Continued)

(58) Field of Classification Search
CPC .......... H01Q 1/243; H01Q 5/00; H01Q 21/00; H01Q 17/00; G01S 13/89
(Continued)

(56) References Cited

U.S. PATENT DOCUMENTS 2,735,070 A 2/1956 Riblet
4,010,715 A 3/1977 Robar et al.
(Continued)

FOREIGN PATENT DOCUMENTS

EP 1845364 A2 10/2007

OTHER PUBLICATIONS

D. Pena et al, "Measurement and modeling ofpropagation losses in brick and concrete walls for the 900-MHz band,", IEEE Transactions on Antennas and Propagation, vol. 51, Issue: 1 (2003).
(Continued)

*Primary Examiner* — Huedung X Mancuso
(74) *Attorney, Agent, or Firm* — Browdy and Neimark, PLLC (57) ABSTRACT

A system and methods for RF (Radio Frequency) penetration imaging of one or more objects in a medium, the system including a generation and reception subsystem configured to generate and receive a plurality of RF signals, an RF antenna array including a plurality of antennas, the antennas being configured to transmit the RF signals towards the medium and receive a plurality of RF signals reflected from the medium, a data acquisition subsystem configured to receive and store the reflected RF signals, and a processor configured to estimate the distance between the surface of the target medium and the antenna array, the delay between the transmitted signals and the plurality of signals reflected from the object using a dedicated frequency sub-band of the received signals, the location of the antennas at each transmitting time, and determine whether there is an object within the medium.

20 Claims, 5 Drawing Sheets

Related U.S. Application Data (60) Provisional application No. 62/200,075, filed on Aug. 2, 2015.

(51) Int. Cl.
    *H01Q 1/22*     (2006.01)
    *H01Q 1/24*     (2006.01)
    *H01Q 5/00*     (2015.01)
    *H01Q 21/06*     (2006.01)
    *G01S 13/88*     (2006.01)
    *G01S 13/89*     (2006.01)

(52) U.S. Cl.
    CPC .............. *H01Q 1/243* (2013.01); *H01Q 5/00* (2013.01); *H01Q 21/00* (2013.01); *H01Q 21/061* (2013.01)

(58) Field of Classification Search
    USPC .......................................................... 343/909
    See application file for complete search history.

(56) References Cited

U.S. PATENT DOCUMENTS

| | | | |
|---|---|---|---|
| 4,211,224 | A | 7/1980 | Kubach |
| 4,211,911 | A | 7/1980 | Dehn |
| 4,626,805 | A | 12/1986 | Jones |
| 5,039,824 | A | 8/1991 | Takashima |
| 5,101,163 | A | 3/1992 | Agar |
| 5,389,735 | A | 2/1995 | Bockelman |
| 5,572,160 | A | 11/1996 | Wadell |
| 5,718,208 | A | 2/1998 | Brautigan |
| 5,774,801 | A | 6/1998 | Li et al. |
| 5,829,522 | A | 11/1998 | Ross |
| 6,512,475 | B1 | 1/2003 | Bogatyrev et al. |
| 6,636,816 | B1 | 10/2003 | Dvorak et al. |
| 6,806,821 | B2 | 10/2004 | McLemore |
| 7,034,548 | B2 | 4/2006 | Anderson et al. |
| 7,148,702 | B2 | 12/2006 | Wong et al. |
| 7,298,312 | B2 | 11/2007 | McLemore |
| 7,307,575 | B2 | 12/2007 | Zemany |
| 7,387,010 | B2 | 6/2008 | Sunshine |
| 7,448,880 | B2 | 11/2008 | Osaka |
| 7,668,046 | B2 | 2/2010 | Banker |
| 7,755,010 | B2 | 7/2010 | Godshalk |
| 7,920,088 | B2 * | 4/2011 | Thompson .............. G01S 7/414 342/118 |
| 8,050,740 | B2 | 11/2011 | Davis |
| 8,095,204 | B2 | 1/2012 | Smith |
| 8,331,854 | B2 * | 12/2012 | Rappaport ............. H04B 1/719 455/11.1 |
| 8,494,615 | B2 | 7/2013 | Melamed et al. |
| 8,620,238 | B2 | 12/2013 | Chan et al. |
| 8,779,965 | B2 * | 7/2014 | Sentelle .................. G01S 13/32 342/22 |
| 8,917,199 | B2 * | 12/2014 | Samaniego ........... G01S 13/885 342/22 |
| 9,121,943 | B2 | 9/2015 | Stirling-Gallacher |
| 9,223,018 | B2 | 12/2015 | Dayi et al. |
| 9,229,102 | B1 * | 1/2016 | Wright .................. G01S 13/888 |
| 9,261,592 | B2 | 2/2016 | Boufounos et al. |
| 2002/0165295 | A1 | 11/2002 | Matsumoto |
| 2003/0146767 | A1 | 8/2003 | Steele |
| 2004/0051790 | A1 | 3/2004 | Tamaru et al. |
| 2004/0077943 | A1 | 4/2004 | Meaney |
| 2004/0190377 | A1 | 9/2004 | Lewandowski |
| 2005/0040832 | A1 | 2/2005 | Steele et al. |
| 2005/0255276 | A1 | 11/2005 | Bethune |
| 2006/0176062 | A1 | 8/2006 | Yang et al. |
| 2006/0220658 | A1 | 10/2006 | Okamura |
| 2008/0296306 | A1 | 12/2008 | Handa |
| 2011/0060215 | A1 | 3/2011 | Tupin |
| 2011/0068807 | A1 | 3/2011 | Kesil et al. |
| 2011/0134001 | A1 | 6/2011 | Sakata |
| 2011/0237939 | A1 | 9/2011 | Melamed et al. |
| 2012/0242341 | A1 | 9/2012 | Olsson |
| 2013/0141287 | A1 | 6/2013 | Pallonen |
| 2013/0231046 | A1 | 9/2013 | Pope |
| 2013/0241780 | A1 | 9/2013 | Amm et al. |
| 2013/0271328 | A1 | 10/2013 | Nickel |
| 2013/0300573 | A1 | 11/2013 | Brown |
| 2013/0329139 | A1 | 12/2013 | Feher |
| 2014/0066757 | A1 | 3/2014 | Naftali |
| 2014/0179239 | A1 | 6/2014 | Nickel |
| 2015/0049170 | A1 | 2/2015 | Kapadia et al. |
| 2016/0336643 | A1 | 11/2016 | Pascolini |
| 2018/0128915 | A1 | 5/2018 | Lomnitz et al. |

OTHER PUBLICATIONS

G. Roqueta et al., "Analysis of the Electromagnetic Signature of Reinforced Concrete Structures for Nondestructive Evaluation of Corrosion Damage," IEEE Transactions on Instnumentation and Measurement, vol. 61, Issue: 4 (2012).

Xian-Qi He et al., "Review of GPR Rebar Detection", PIERS Proceedings, Beijing, China, Mar. 23-27, 2009.

C. Stolte et al., "Eccentricity-migration: A method to improve the imaging of pipes in radar reflection data", Fifth International Conference on Ground Penetrating Radar, Expanded Abstracts, Proceedings, Ontario, Canada, 723-733, (1994).

Kruk Jan Van Der, "Three dimensional imaging of multi-component ground penetrating radar data" (Phd dissertation) (2001).

R. Streich et al., "Accurate imaging of multicomponent GPR data based on exact radiation patterns," IEEE Transactions on Geoscience and Remote Sensing, vol. 45, 93-103 (2007).

Crocco L et al: "Early-stage leaking 1-13 pipes GPR monitoring via microwave A tomographic inversion" Journal of Applied Geophysics. Elsevier. Amsterdam. NL. vol. 67. No. 4. Apr. 1, 2009 (Apr. 1, 2009). pp. 270-277. XP026033856.

Ayliffe et al., 'Electric Impedance Spectroscopy' Using Microchannels with Integrated Metal Electrodes IEEE Journal of Microelectromechanical Systems, vol. 8, No. 1, Mar. 1999.

P. Lombardini et al., "Criteria for the Design of Loop-Type 12 Directional Couplers for the L Band" (1956).

Pallavi R. Malamel et al., "Microwave Reflectometry Based Electrical Characterization of Milk for Adulteration Detection", Advance in Electronic and Electric Engineering, ISSN 2231-1297, vol. 4, No. 5 (2014), pp. 487-492.

Valerie Favry, "Design and Development of a Novel Electronic Sensor for Detecting Mastitis Based on Conductance/Impedance Measurements", Thesis submitted for the Degree o f Master o f Science,Supervised by Prof. Dermot Diamond School o f Chemical Sciences, National centre for Sensor Research Jul. 2004.

Valerie Favry, "Design and Development of a Novel Electronic Sensor for Detecting Mastitis Based on Conductance/Impedance Measurements".

* cited by examiner

SYSTEM AND METHOD FOR RADIO FREQUENCY PENETRATION IMAGING OF AN OBJECT

FIELD OF THE INVENTION

The present invention relates to a system and method for imaging an object or structure and more specifically, but not exclusively, to RF (Radio Frequency) penetration imaging of an object or structure within a medium.

BACKGROUND OF THE INVENTION

Prior RF devices for imaging or scanning within a medium, such as ground penetrating radars (GPR), typically assume a fixed, or minimal variation, distance between the imaging device antennas to the surface of the medium throughout the scanning or imaging process. Moreover, this distance is typically smaller than the transmission wavelength (i.e. sub-wavelength distance), i.e. the imaging device antennas are attached or in very close proximity to the surface of the medium.

These two assumptions, separately, and together, play an important role in the ability to form a coherent and accurate image for the analysis of the underlying structures and objects within the medium. Amongst such image techniques one finds, radiograms, migration techniques.

Knowing where the signals were collected relative to the medium surface is critical for an aligned focusing of the signals as part of the imaging and/or medium scanning process.

Additionally, the prior devices can be less than ideal in at least some respects. Prior devices having high imaging and accurate capabilities can be larger than ideal for use in many portable applications. Also, the cost of prior devices can be greater than would be ideal. The prior devices can be somewhat bulky, difficult to activate requiring for example specific and constant distance from the medium, for example prior devices must be attached to the medium.

In light of the above, an improved imaging system that overcomes at least some of the above mentioned deficiencies of the prior devices would be beneficial. Ideally such imaging device would be a compact, integrated with a consumer device such as a cellular telephone, sufficiently rugged and low in cost to be practical for end-user imaging of objects or structures within a medium and convenient to use.

SUMMARY OF INVENTION

Prior to the Summary of the invention being set forth, it may be helpful to set forth definitions of certain terms that will be used hereinafter.

The term 'Penetration RF imaging' or 'Standoff penetration RF imaging' as used herein is defined as the process of imaging by an imaging system a medium internal structure or objects while not being in direct contact with its surface, e.g. at a distance larger than the wavelength used by the imaging device.

The term 'target medium' as used herein is defined as an homogeneous or close to homogenous material in which scattering objects (i.e. objects or structures of different electromagnetic properties than the medium) may be present in and may be for example air, concrete, plaster, fluids, human tissues etc.

The term 'interim medium' as used herein is defined as an homogeneous or close to homogeneous material medium located between the device and the target medium, of different electromagnetic properties that the target medium, such that the surface of the target medium is distinct from the interim medium, typically the interim medium being free of objects or structures, the device moving freely in this medium, the interim medium may be for example air, fluids, etc.

According to a first aspect of the invention there is provided a RF (Radio Frequency) imaging system, for imaging at least one object within a target medium, the system comprising a generation and reception unit configured to generate and receive a plurality of RF signals; an RF antenna array, the RF antenna array comprises a plurality of antennas, said plurality of antennas are configured to transmit the plurality of RF signals towards the target medium and receive a plurality of RF signals reflected from the target medium; a data acquisition unit configured to receive and store said plurality of reflected RF signals; and at least one processor unit, said at least one processor unit is configured to: estimate the distance between the surface of the target medium and the antenna array; calculate the delay between the plurality of transmitted signals and the plurality of signals reflected from the at least one object; estimate the location of the plurality of antennas at each transmitting time; and provide an image of the at least one object location and the intensity of the plurality of reflected RF signals.

In an embodiment, the at least one processor is configured to analyze the angular orientation between the antenna array and the target medium surface.

In an embodiment, the system comprises a display and wherein the image is displayed on said display.

In an embodiment, an interim medium is located between the target medium and the antenna array of the imaging system and the antenna array is positioned or moved in a distance from the target medium.

In an embodiment, the distance is constant or variable.

In an embodiment, the distance is larger than a wavelength.

In an embodiment, the interim medium or the target medium are selected from the group consisting of: air, concrete, plaster, fluids, human tissues.

In an embodiment, the image is 2D (two dimension) or 3D (three dimension) image.

In an embodiment, the RF signals are Ultra Wide Band signals.

In an embodiment, the RF imaging system is portable.

In an embodiment, the antenna array is configured to communicate with orientation or measurements devices, said devices are selected from the group consisting of: accelerometers, gyros, laser distance measurement devices.

According to a second aspect there is provided a method for imaging at least one object within a target medium, the method comprising: transmitting a plurality of RF (radio frequency) signals by an RF antenna array, said RF antenna array comprises a plurality of RF antennas; receiving at said RF antenna array a plurality of RF signals reflected from the at least one object; estimating the distance between the surface of the target medium and the antenna array; calculating the delay between the plurality of transmitted signals and the received signals reflected from the at least one object;

In an embodiment, the method comprise estimating a location of the plurality of RF antennas at each transmitting time of said plurality of transmitted signals; and providing an image the at least one object location.

In an embodiment, the method comprising providing the intensity of the reflected RF signals from the at least one object.

In an embodiment, the meth comprising estimating the presence or lack of the at least one object.

In an embodiment, an interim medium is located between the target medium and the antenna array of the imaging system and the antenna array is positioned or moved in a distance from the target medium.

In an embodiment, the distance is constant or variable.

In an embodiment, the angular orientation between the antenna array and the target medium surface is estimated from the received signals.

In an embodiment, the distance between the surface of the target medium and the antenna array is estimated using the high frequency band of the plurality of received signals.

In an embodiment, the delay is estimated from a subset of the plurality of received RF signals and/or using a dedicated frequency sub-band of the received signals.

In an embodiment, the estimation of the location or orientation of the antenna array is improved using measurements from at least one or more accelerometers, gyros, cameras, laser devices.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks, according to embodiments of the invention, could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein, are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The subject matter disclosed may best be understood by reference to the following detailed description when read with the accompanying drawings in which.

DETAILED DESCRIPTION OF THE INVENTION

The present invention relates to a system, device and methods for RF imaging an object or structure within a medium and more specifically, but not exclusively, to an RF penetration imaging within a medium for example a standoff RF penetration imaging.

Embodiments of the disclosure provide a system and methods for imaging (e.g. 2D imaging or 3D imaging) of one or more objects (e.g. hidden objects to be imaged such as pipe or a miniaturized element) inside a target medium (e.g. solid medium such as a wall). The system comprises an RF unit configured to transmit and receive RF signals which penetrate through the target medium (e.g. wall, fluids, etc.), one or more processing units configured to process the multiple RF signals reflected from the objects and/or the target medium surface and to provide an image of the hidden objects. The visualization may be or may include a graphical visualization (e.g. rendered graphical visualization). For example, the graphical visualization may include an image such as a 2D or 3D image of the hidden objects inside the target medium comprising one or more of the object's parameters such as size, width volume etc., or indication of the presence or lack of objects within the medium. In some cases, an interim medium is located between the target medium and the imaging device and the antenna array may be positioned or moved at a distance from the medium.

Specifically, a system and methods disclosed herein comprise scanning or imaging a medium regardless of the distance between the device (e.g. the device antennas) and the target medium surface, e.g. allowing for the distance from device antennas (e.g. the antenna array) to the target medium surface to change throughout the scanning process and not be limited to near field (e.g. sub-wavelength and/or comparable wavelength) distance, for example, attached or almost attached to the target medium or far-field (e.g. larger than wavelength) standoff distance.

In other words, the two prior art assumptions mentioned herein above, i.e. requiring constant distance between the imaging device antennas to the surface of the target medium throughout the scanning or imaging process and/or a distance smaller than the antenna wavelength, are eliminated according to the present invention embodiments.

In some cases, received RF signals, for example signals received by the system's receive antennas are combined in a coherent way by compensating for the occurred propagation delays within the medium. These delays can be estimated from a subset of received RF signals and/or for example using a dedicated frequency sub-band of the received signals.

According to some embodiments the system and method may be used in conjunction with additional orientation and/or distance measurement devices including for example accelerometers, gyros, laser distance measuring devices.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 1:
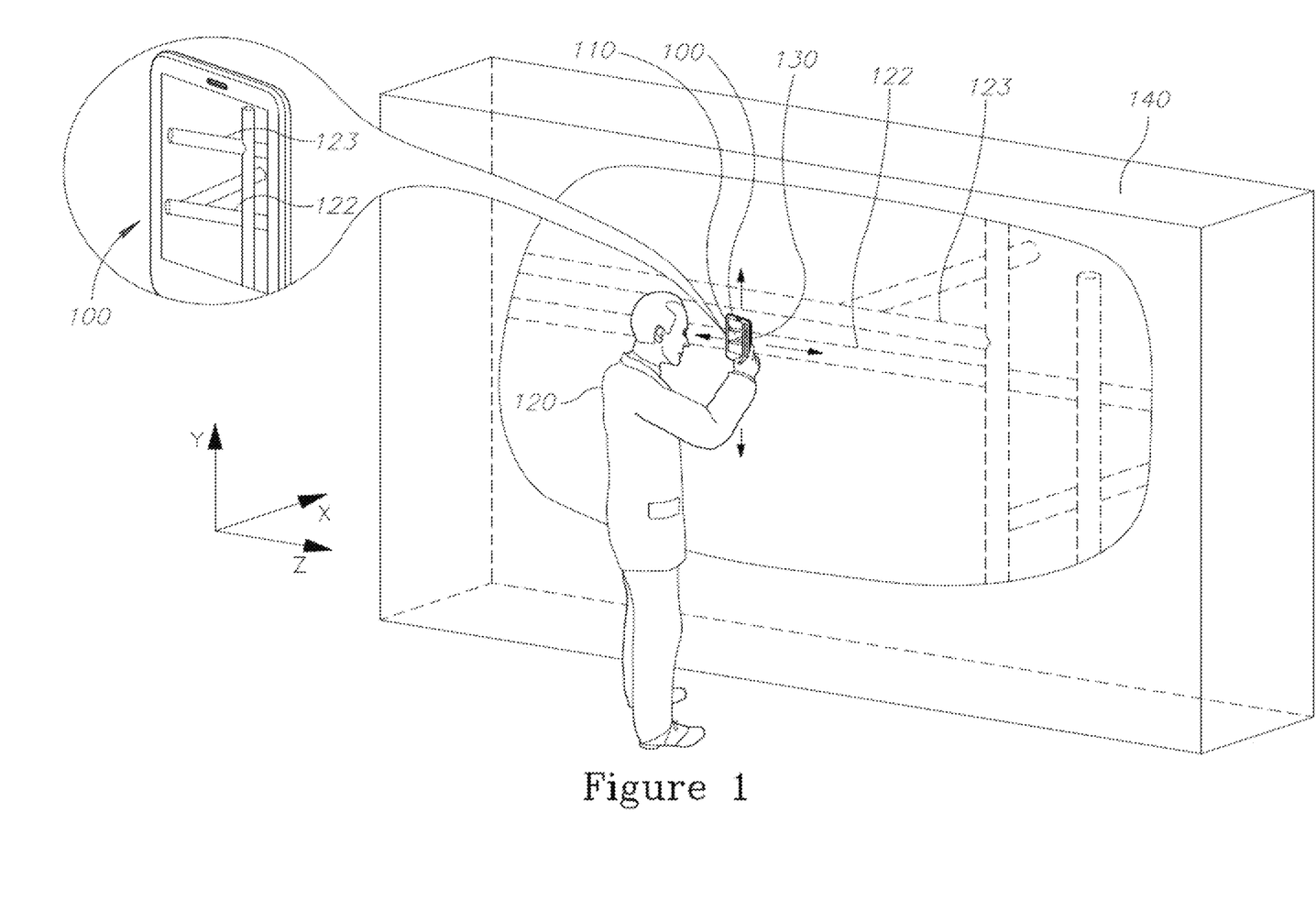
FIG. 1 is a simplified schematic diagram illustrating a user scanning the surface of a target medium by a mobile device, in accordance with examples.

Referring now to the drawings, FIG. 1 is a simplified schematic diagram showing a user 120 scanning the surface of a target medium such as a wall 140 by an imaging device 130. In some embodiments the imaging device 130 may be in communication or mounted possibly but not exclusively as an add-on, for example on a mobile device 100, (e.g. mobile phone). The target medium may be made of for example a solid element such as wood, stone, gypsum, concrete or non solid elements such as air, water, or a combination thereof. The mobile device 100 may be for example a communication mobile device such as a mobile phone for example a smartphone or a tablet as will be illustrated specifically herein below in FIG. 2.

In operation, the user 120 places the imaging device 130 in proximity to the wall for example in parallel to the wall (e.g. in front of the wall, few cm from the surface of the wall for example between 1-100 cm from the wall, or less). The distance may change during the scanning. Once the user 120 scans the wall, one or more hidden objects such as vertical rebars 122 and 123 embedded within the wall in front or in proximity to the device 130 may be imaged and displayed to the user in real time (or offline), for example on a display unit 110 of the device 100. In some cases the image may include a 3D image of the objects including specific information of the object's parameters such as size, orientation, radius, depth, and distance from the object to the imaging device. In some cases a complete image of the wall 140 and the internal objects embedded in the wall 140 may be identified and imaged.

In some cases, the image may be or may include a visualization such as a graphical visualization or a rendered graphical visualization of the object including the object's parameters such as size, orientation, distance from the medium etc.

According to some embodiments the imaging device 130 is further configured to interface with the mobile device 100 computing platform. The mobile device 100 may be for example a smartphone which may include a processor and software modules associated with the imaging device 130 which are executed by the mobile device processor.

For example, the imaging device 130 may be attached to the mobile device 100, and the imaging device 130 may be in communication to one or more processing units and/or a display unit of the mobile device 100.

In some case, the user 120 may scan the surface of the wall by the imaging device 130 and the scanned data may be transmitted via wire or wireless connection to a database unit located for example in a cloud or in the mobile device 100 and the scanned data may be processed by one or more external processing units or internal processing unit of the imaging device 130 or the mobile device 100.

According to some embodiments, the imaging device 130 may be a standalone device, for example a standalone portable device.

In some cases the scanned date (e.g. graphic visualization, parameters, or an image of the object) may be displayed to the user on headset (goggles) such as a VR (Virtual Reality) and/or AR (Augmented Reality) headset or on the mobile device such as smartphone.

The imaging device 130 and/or the mobile device 100 can have a size and weight such that the device can be held by a user with only one hand. The imaging device 130 can have a size and weight such that the device can be portable. The device can have a weight of about 100 gram (g), 200 g, 300 g, 400 g, 500 g, 600 g, 700 g, 800 g, 900 g, 1000 g. The imaging device can have a weight that is between any of the two values given above. The imaging device can have a weight greater than 1000 g.

The imaging device 130 shape can comprise a rectangular prism, cylinder, or other three-dimensional shape.

One or more of the components of the imaging device 130 can be powered by a battery.

Figure 2:
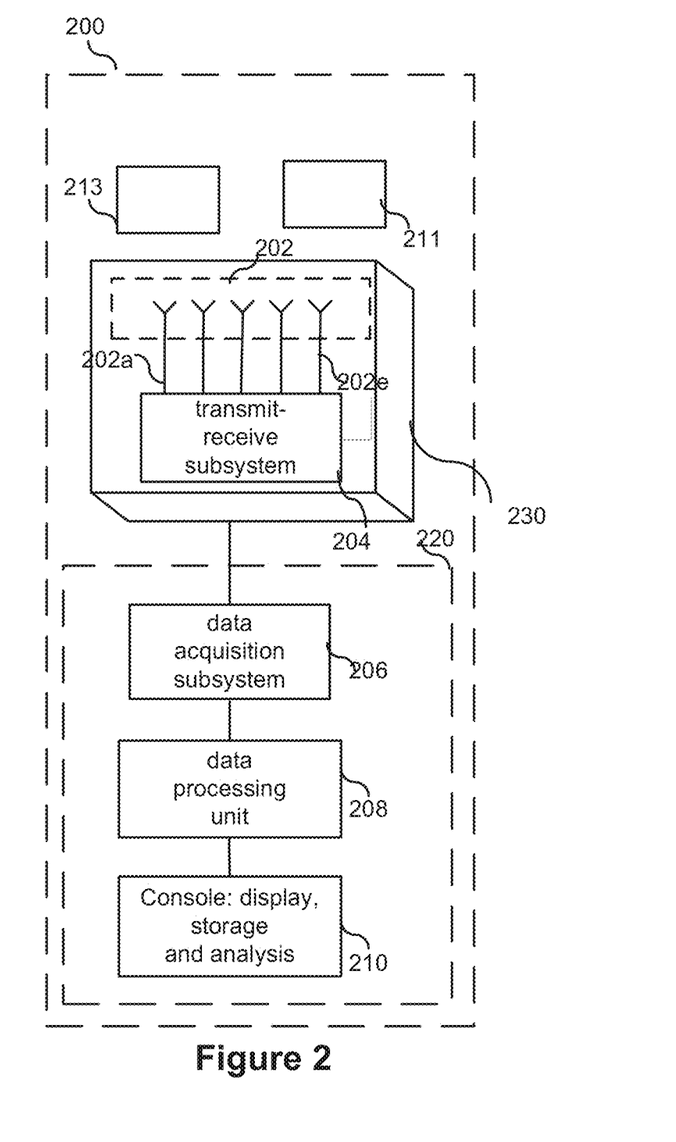
FIG. 2 is a schematic view of an RF penetration imaging system, in accordance with examples.

FIG. 2 is block diagram illustrating the architecture of an RF penetration imaging system 200. The system comprises the principal functions of the above mentioned imaging device 130 and relevant functions of a mobile device 100 which may be attached to or in communication with it.

The imaging system 200 may include an RF signal generation and reception subsystem 204, an antenna array subsystem 202, a data acquisition subsystem 206, and one or more data processors or processing units 208, and additional sensors such as one or more accelerometers and/or gyroscopes 211 and/or one or more cameras 213 and/or a console 210 (for display storage and analysis).

The RF signal generation and reception (transmit-receive) subsystem 204 is responsible for generation of the microwave signals, coupling them to the antennas 202a-202e, reception of the microwave signals from the antennas and converting them into a form suitable for acquisition. The RF signals can be pulse signals, stepped-frequency signals, chirp signals and the like. The generation circuitry can involve oscillators, synthesizers, mixers, or it can be based on pulse oriented circuits such as logic gates or step-recovery diodes. For example these signals may be microwave signals in the UWB band 3, 4, 5, 6, 7, 8, 9 or 10 GHz (having a wavelength of 10-3 cm correspondingly in air).

The conversion process can include down conversion, sampling, and the like. The conversion process typically includes averaging in the form of low-pass filtering, to improve the signal-to-noise ratios and to allow for lower sampling rates. The RF signal generation and reception subsystem 204 can perform transmission and reception with multiple antennas at a time or select one transmit and one receive antenna at a time, according to a tradeoff between complexity and acquisition time. In an embodiment, the RF signal generation and reception subsystem 204 may comprise a single RF Integrated Circuit (RFIC) or several RFICs.

The imaging system 200 may include one or more antennas such as antenna array 202. For example the antenna array 202 may include multiple antennas 202a-202e typically between a few and several dozen (for example 30) antennas. The antennas can be of many types known in the art, such as printed antennas, waveguide antennas, dipole antennas or "Vivaldi" broadband antennas. The antenna array can be linear or two-dimensional, flat or conformal to the region of interest.

According to one embodiment, the antenna array 202 comprises a number of antennas for each frequency range, or a single antenna for each frequency range, or a single antenna supporting the entire frequency range. According to another example, the array may include 20 antennas where 5 antennas are dedicated for each out of the 4 frequency bands.

According to some embodiment, the antenna array 202 may be an array of flat broadband antennas, for example spiral shaped antennas. The antenna array 202 may include a layer of matching material for improved coupling of the antenna radiation to the materials or objects under test. The unique and optimized shape of the antenna array enables their use in limited sized mobile devices, such as a thin, small-sized smart phone or tablet.

The data acquisition subsystem 206 collects and digitizes the signals from the RF signal generation and reception subsystem 204 while tagging the signals according to the antenna combination used and the time at which the signals were collected. The data acquisition subsystem will typically include analog-to-digital (A/D) converters and data buffers, but it may include additional functions such as signal averaging, correlation of waveforms with templates or converting signals between frequency and time domain.

The data acquisition subsystem 206 may include a Radio Frequency Signals Imaging device (RFSMU) such as a Vector Network Analyzer (VNA) for measuring the received/reflected signals.

The data processing unit 208 is responsible for converting the collected signals into a set of responses characterizing the target objects, and performing the algorithms for converting the sets of responses, for example providing the location of the target objects, the intensity of the signal reflection from the objects.

Example of algorithms for converting the sets of responses may be for example Delay and Sum (DAS) algorithm, PFA (polar format SAR algorithm), RMA (Range Migration Algorithm).

According to some embodiments, the imaging system 200 may include accelerometers and/or gyros and/or laser distance measuring devices 211 to fine tune and give additional data in respect to the movement or the distance of the imaging system 200.

Additionally, the imaging system 200 may include a camera 213 to obtain the system relative location or movement in respect to a reference location, as will be illustrated in details hereinabove.

Such additional measurements can be used as prior information to improve the location and orientation calculation using the signals received and transmitted by the antennas, or can be used to improve the calculation of location and orientation after it has been calculated from the signals received and transmitted by the antennas. The improvement can be achieved using a variety of methods, such as Kalman Filtering, Particle Filtering, Bayesian Filtering or other methods. Once the location and orientation information of the antennas array were calculated, it can be used in the imaging process as displacement information between measurements, for example in migration algorithms.

A final step in the process includes making use of the resulting parameters or image, either in the form of visualization, display, storage, archiving, or input to feature detection algorithms. This step is exemplified in FIG. 2 as console 210. The console for example may be part of a mobile device for example implemented as a handheld computer such as a mobile phone, laptop computer or a desktop computer with appropriate application software.

According to one embodiment of this invention, an imaging device 230, which is part of the RF penetration imaging system 200, may comprise the RF transmit-receive subsystem 204 and the antenna array subsystem 202 as shown in FIG. 2, while a mobile device 220 (e.g. mobile phone) may comprise some or all the remaining functional blocks of 200. The imaging device may be connected to the mobile device 220, for example through a dedicated connection such a USB connection, wireless connection or any connection known in the art. Following the connection of the imaging device 230 to the mobile device 220, the imaging device 230 may utilize the mobile device's own data acquisition, data processing display, and storage and analysis subsystems.

According to another embodiment, data acquisition subsystem 206, data processing unit 208 as well as measuring devices 211 and 213 may also be part of the imaging device 230 (in addition to RF transmit-receive subsystem 204 and the antenna array subsystem 202). The console 210 may also be integrated into the imaging device 230, thus getting a complete stand alone system. Alternatively, the console 210 is typically implemented as a handheld computer such as a mobile phone or a desktop computer with appropriate application software. It is stressed that other embodiments comprising alternative arrangements of the subsystems between the imaging device 230 the RF penetration imaging system 200 and the mobile device are applicable.

Figure 3:
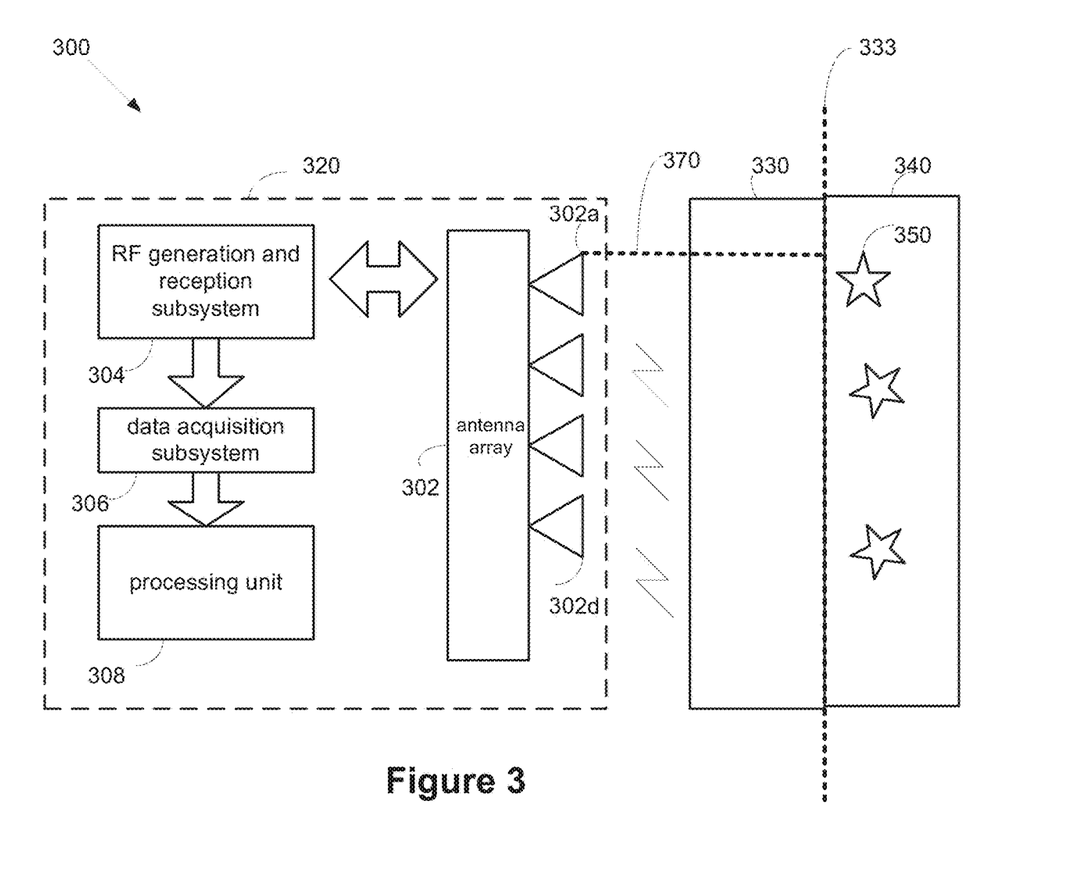
FIG. 3 is a simplified block diagram showing a system configuration for imaging a medium in accordance with examples.

FIG. 3 is a simplified block diagram side view description showing a system configuration 300 for imaging a target medium 340 and one or more objects (e.g. one or more scattering objects 350) within the target medium in accordance with embodiments.

The system 300 comprises an RF penetration imaging system 320 which may comprise one of the units and subsystems illustrated in system 200 of FIG. 2. Only the antenna array subsystem 302, the RF generation and reception subsystem 304 and the data acquisition subsystem 306 and processing unit 308 are shown in FIG. 3.

In operation, the imaging device is positioned and/or moved at a distance 370 from the target medium surface 333. The distance 370 may the distance between the antenna array 302 and the target medium outer surface 333. In some cases the distance 370 may be constant or variable as the user scans and image the target medium. During the scanning process the antenna array 302 transmits one or more RF signals generated by the RF signal generation and reception subsystem 304 towards the target medium 340. When the antenna array 302 is not attached to the target medium 340 (or in very close proximity with it), e.g. at a standoff distance, the RF signals propagate through an interim medium 330. In some instances, the interim medium 330 may be or may include air or other intermediate matched medium located between the antenna array 302 and a target medium 340.

Figure 4:
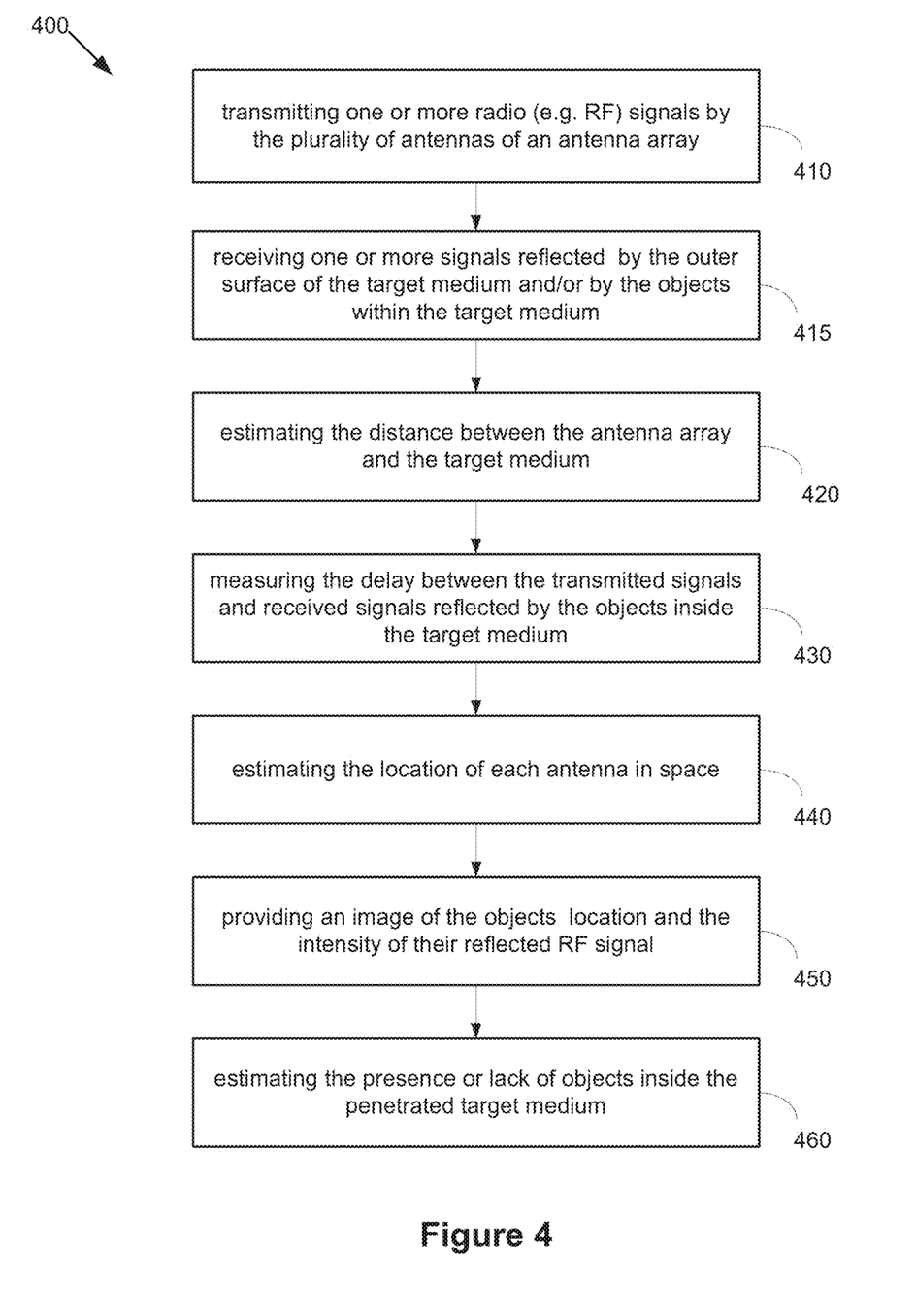
FIG. 4 is a flowchart illustrating a method for imaging a target medium and one or more objects located within a medium, in accordance with examples.

FIG. 4 is a flowchart 400 illustrating a method for imaging one or more objects located within the target medium, in accordance with embodiments.

Step 410 comprises transmitting one or more RF signals by one or more antennas of the antenna array 302 and step 415 comprises receiving at the antenna array one or more signals reflected by the outer surface 333 of the target medium and/or by the objects 350 within the target medium.

Figure 5:
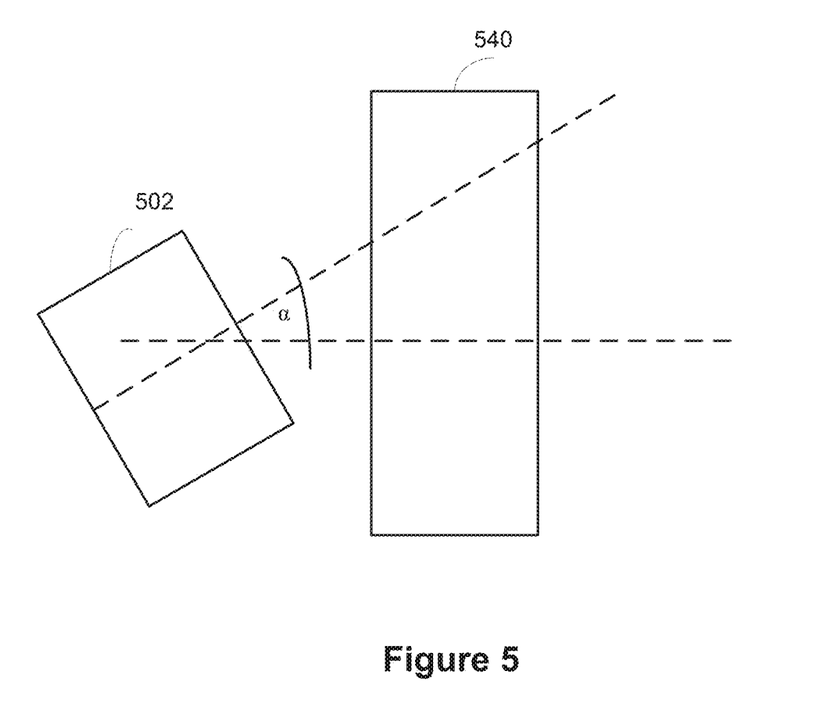
FIG. 5 is a simplified block diagram illustrating a rotation angle of the imaging in accordance with examples.

Step 420 comprises estimating the distance 370 between the antenna array and the outer surface 333 of the target medium, for example estimating the distance between the surface of the target medium 340 and the antenna array 302. This distance estimation may be provided, for example, using the high frequency band of the RF signals. For example (for a case where the entire band is 3-10 GHz) the higher frequency band of the signals used for this estimation may be 6-10 GHz. In addition, step 420 includes evaluation of the antenna array angular orientation in respect to the target medium surface. For example as illustrated in FIG. 5, the angular orientation may include the rotation angle α of the antenna array 502 in respect to the surface of the target medium 540.

Step 430 comprises measuring the propagation delay between the transmitted signals and received signals reflected by the scattering objects 350 inside the target medium 340. The different electromagnetic properties of the interim and target medium materials and the distance measured in accordance with step 420 are taken into account to separate the delay incurred within the target medium (i.e. the propagation delay from the outer surface of the target medium to the object) out of the overall propagation delay.

Step 440 comprises estimating the location of each antenna in space (e.g. antenna 302a-d) relative to the target medium (e.g. the surface 333 of the target medium 340) during the scanning process (e.g. while transmitting and receiving the signals affected by the medium). This estimation can be performed using, but not limited to, inertial measurements device on the antennas or the signals themselves.

Step 450 comprises providing an image of the scattered objects 350 location and the intensity of their reflected RF signal, using one or more methods, such as, but not limited to, DAS (delay and sum), PFA (polar format SAR algorithm), RMA (Range Migration Algorithm).

Step 460 comprises estimating the presence or lack of scattered objects inside the target medium according to the image provided in step 450.

This embodiment can use RF signals such as UWB (Ultra Wide Band) signals, covering a large frequency range (e.g. 3-10 GHz). The higher frequency band of the signals (e.g. 6-10 GHz) enable increased accuracy in estimating the distance between the antenna array and the surface 333 of the target medium (Step 420). It is noted that typically the propagation path loss in the interim medium is small in spite of the high frequencies used. The whole frequency band of the RF signals and the lower frequency band in particular, are used to estimate the overall delay (Step 430), with a larger (but sufficient) accuracy. It is noted that at lower frequencies the signals incur a smaller propagation path loss in the target medium.

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for determining whether there is at least one object within a target medium, the method comprising:
   scanning the target medium using a mobile device, wherein said mobile device comprising a radio frequency (RF) array, said RF antenna array comprises a plurality of RF antennas and wherein said mobile device is positioned away at a distance from the target medium;
   transmitting a plurality of RF signals by the RF antenna array to the target medium;
   receiving at the mobile device a plurality of reflected RF signals from the target medium;
   estimating the delay between the plurality of transmitted signals and the RF reflected signals from the at least one object, wherein the delay is estimated using a dedicated frequency sub-band of the reflected RF signals; and
   determining whether there is at least one object within the target medium.

2. The method of claim 1, comprising providing an image of the at least one object location.

3. The method of claim 2, wherein the image is a two dimensional (2D) or a three dimensional (3D) image.

4. The method of claim 1 comprising providing the intensity of the reflected RF signal of the at least one object.

5. The method of claim 1, wherein the distance is constant or variable.

6. The method of claim 1, wherein the distance is larger than a wavelength.

7. The method of claim 1, comprising estimating the angular orientation between the RF array and the target medium surface.

8. The method of claim 1, wherein the distance between the surface of the target medium and the RF array is estimated using the high frequency band of the RF reflected signals.

9. A radio frequency (RF) system for determining whether there is at least one object within a target medium, the system comprising
   a generation and reception subsystem configured to generate and receive a plurality of RF signals;
   an RF antenna array, the RF antenna array comprises a plurality of antennas configured to transmit the plurality of RF signals towards the target medium and receive a plurality of RF signals reflected from the target medium;
   a data acquisition subsystem configured to receive and store said plurality of reflected RF signals; and
   at least one processor, said at least one processor is configured to:
     estimate the distance between the surface of the target medium and the antenna array;
     estimate the delay between the plurality of transmitted signals and the plurality of signals reflected from the at least one object, wherein the delay is estimated using a dedicated frequency sub-band of the received signals;
     estimate the location of the plurality of antennas at each transmitting time; and determine whether there is at least one object within a target medium.

10. The system of claim 9, wherein the at least one processor is further configured to provide an image of the at least one object location.

11. The system of claim 10, wherein the system comprises a display and wherein the image is displayed on said display.

12. The system of claim 10, wherein the image is a two dimensional (2D) or a three dimensional (3D) image.

13. The system of claim 9, wherein the at least one processor is further configured to provide the intensity of the plurality of reflected RF signals.

14. The system of claim 9, wherein said at least one processor is configured to analyze the angular orientation between the antenna array and the target medium surface.

15. The system of claim 9, wherein an interim medium is located between the target medium and the antenna array of the imaging system and the antenna array is positioned or moved in a distance from the target medium.

16. The system of claim 9, wherein the distance is constant or variable.

17. The system of claim 9, wherein the distance is larger than a wavelength.

18. The system of claim 15, wherein an interim medium is located between the target medium and the antenna array of the imaging system and the RF array is positioned or moved in the distance from the target medium.

19. The system of claim 15, wherein the interim medium or the target medium is selected from the group consisting of: air, concrete, plaster, fluids, human tissues.

20. The system of claim 9, wherein the RF signals are Ultra Wide Band signals.

* * * * *